(12) United States Patent
Uhlhorn et al.

(10) Patent No.: US 7,184,622 B2
(45) Date of Patent: Feb. 27, 2007

(54) INTEGRATED VOLUME HOLOGRAPHIC OPTICAL CIRCUIT APPARATUS

(75) Inventors: Brian L. Uhlhorn, Eagan, MN (US); Rick C. Stevens, Apple Valley, MN (US); Gregory J. Whaley, Woodbury, MN (US); John A. Krawczak, Minnetonka, MN (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 11/080,703

(22) Filed: Mar. 15, 2005

(65) Prior Publication Data

US 2006/0210214 A1 Sep. 21, 2006

(51) Int. Cl.
*G02B 6/24* (2006.01)
(52) U.S. Cl. .......................................... 385/24
(58) Field of Classification Search ...................... None
See application file for complete search history.

(56) References Cited

U.S. PATENT DOCUMENTS

| | | | |
|---|---|---|---|
| 4,838,630 A | 6/1989 | Jannson et al. | |
| 5,020,153 A | 5/1991 | Choa et al. | |
| 5,053,837 A | 10/1991 | Tonai | |
| 5,847,855 A | 12/1998 | Choa | |
| 6,348,683 B1 | 2/2002 | Verghese et al. | |
| 6,674,785 B2 | 1/2004 | Sato et al. | |
| 6,678,429 B2 | 1/2004 | Mossberg et al. | |
| 6,771,855 B2 | 8/2004 | Pezeshki et al. | |
| 6,778,581 B1 * | 8/2004 | Lipson ........................ | 372/96 |
| 6,823,115 B2 | 11/2004 | Greiner et al. | |
| 6,829,417 B2 | 12/2004 | Greiner et al. | |
| 2002/0074631 A1 | 6/2002 | Sato et al. | |
| 2002/0085806 A1 | 7/2002 | Pezeshki et al. | |
| 2002/0117675 A1 | 8/2002 | Mascarenhas | |
| 2003/0011851 A1 | 1/2003 | Trezza | |
| 2003/0020091 A1 | 1/2003 | Tungare et al. | |
| 2003/0072053 A1 * | 4/2003 | Weaver et al. .............. | 359/124 |
| 2004/0065888 A1 | 4/2004 | Sato et al. | |

(Continued)

OTHER PUBLICATIONS

Greiner, C.M., Iazikov, D., and Mossberg, T.W., "Wavelength Division Multiplexing Based on Apodized Planar Holographic Bragg Reflectors", *Applied Optics*, Aug. 10, 2004, vol. 43, No. 23, pp. 4575-4583.

(Continued)

*Primary Examiner*—Michelle Connelly-Cushwa
*Assistant Examiner*—Chris H. Chu
(74) *Attorney, Agent, or Firm*—Oppenheimer Wolff & Donnelly LLP

(57) ABSTRACT

The present disclosure is directed to an optical apparatus suitable for coupling to an optical network. The optical apparatus is adapted to transmit multiplexed optical signals on the optical network and/or de-multiplex optical transmissions from the network. The optical apparatus includes an optical waveguide and an optoelectronic device. The optical waveguide has a set of diffractive elements in the form of a scribed volume hologram, which provides an optical transfer function. The optical waveguide also includes a first optical port and a second optical port. The second optical port is adapted to be optically coupled to the optical network. The optoelectronic device includes a plurality of optical portions. The optoelectronic device is adapted to convert optical signals at the optical portions into electric signals and/or convert electric signals into optical signals at the optical portions.

14 Claims, 4 Drawing Sheets

U.S. PATENT DOCUMENTS

| | | |
|---|---|---|
| 2004/0076374 A1 | 4/2004 | Greiner et al. |
| 2004/0170356 A1* | 9/2004 | Iazikov et al. ............... 385/37 |
| 2004/0179779 A1 | 9/2004 | Greiner et al. |
| 2004/0188793 A1 | 9/2004 | Lindemann et al. |
| 2004/0213316 A1 | 10/2004 | Lipson |
| 2004/0228577 A1 | 11/2004 | Pezeshki et al. |

OTHER PUBLICATIONS

Iasikov, D., Greiner, C., and Mossberg, T.W., Fully Integrated Holographic-Bragg-Reflector-Based Mux/Demux Devices; *Integrated Optics: Devices, Materials, and Technologies VIII*, SPIE vol. 5355, pp. 96-102, 2004.

Mossberg, T.W., Greiner, C.M., and Iazikov, D., "Holographic Bragg Reflectors, Photonic Bandgaps and Photonic Integrated Circuits", *Optics & Photonics News*, May 2004, pp. 26-33.

* cited by examiner

INTEGRATED VOLUME HOLOGRAPHIC OPTICAL CIRCUIT APPARATUS

BACKGROUND

The present disclosure is directed to circuit components in optical (or fiber optical) systems. More particularly, the present disclosure is directed to integrated photonic transmitters, receivers, and transceivers providing a wavelength division multiplexer or de-multiplexer with a volume holograph waveguide adapted for use in optical, or photonic, circuits.

Fiber optical systems generally refer to the medium and technology associated with the transmission of signals in the form of light pulses, or photons, along a glass or plastic fiber. Optical systems are distinguishable from electrical systems using conventional electrically conductive wires, such as copper wire, in the transmission of electrical signals. Optical systems also include advantageous capabilities over electrical systems. For example, electrical signals interact with each other and their environment. This results in a need for non-intersecting and spaced-apart electrical wire links between electronic devices or electrical components. In contrast, photons generally do not interact with each other, and this leads to the possibility of different photonic signals sharing the same optical fiber. Accordingly, optical systems are adapted to carry much more information than electrical wire and are subject to far less electromagnetic interference.

Optical systems typically combine different photonic signals onto the same optical fiber, or separate photonic signals carried on the same optical fiber, with a generally similar basic circuit structure. For example, an optical signal can be generated with an optical transmitter. Several optical transmitters can be used to each generate a particular optical signal. Separate optical fibers connect each of the transmitters to an optical multiplexer. The optical signals travel along the optical fiber to inputs of the optical multiplexer. The output of the optical multiplexer is coupled to a single optical fiber. The optical multiplexer is a photonic circuit component that combines several photonic signals into a single photonic transmission that can be carried on the single optical fiber. In order to separate the single photonic transmission on the single optical fiber, the optical fiber is coupled to the input of an optical de-multiplexer. The optical de-multiplexer is a photonic circuit component that separates a single photonic transmission into the individual photonic signals. The outputs of the optical de-multiplexer are coupled to optical fibers that lead to optical receivers. Each of the individual photonic signals is carried on its respective optical fiber to the corresponding optical receiver.

In general, the multiplexer or de-multiplexer in the basic optical structure performs a type of wavelength division multiplexing, or WDM. Wavelength division multiplexing is a fiber optic technique that employs light wavelengths to transmit photonic signals in parallel on the same optical fiber. Wavelength division multiplexing has enabled optical service providers to meet consumer demands for ever-increasing bandwidth. Wavelength division multiplexing uses several to many channels (also known as lambdas or colors) to provide high capacity bandwidth across the optical system or optical network. Each channel carries an individual photonic signal providing the same bandwidth per channel in a single photonic stream. The channels are de-multiplexed at the end location.

Wavelength division multiplexing is used to carry many different types of data on the same optical fiber. One common type of wavelength division multiplexing is dense wavelength division multiplexing, or DWDM, and can use around 160 different channels to provide high capacity bandwidth. Another type of wavelength division multiplexing is coarse wavelength division multiplexing, or CWDM, which can scale far fewer channels than DWDM because the channels are spaced further apart than in DWDM. However, coarse wavelength division multiplexers have advantages in that they are less temperature dependent, do not require more expensive components, and are generally less expensive than DWDM.

Several devices can be used to provide the multiplexing or de-multiplexing functions in the above-described circuit structures. For example, circuits of the related art can use thin film filters (TFFs) or arrayed-waveguide gratings (AWGs). TFFs offer powerful and potentially channel-specific passband control, but typically lead to assembled systems of daisy-chained discrete filters. As the number of channels increase, circuits using TFFs dramatically increase in both the size of the component package and the fabrication complexity of the circuits. AWGs are well suited to provide a large number of channels, but have a limited ability to tailor passband and efforts to flatten the passband have resulted in insertion loss of several decibels. AWGs are also relatively delicate devices that can be rendered inoperable if mishandled or subject to extreme conditions, and are relatively difficult to manufacture because of their low yield rate. Another type of device, the holographic Bragg reflector (HBR), includes many advantages over TFFs and AW/VGs in multiplexing. HBRs are durable, less temperature dependent, relatively small, and exhibit flattop channels. HBRs include many of the better features of TTFs and AWGs while avoiding many of their limitations. Recently, it has been proposed that HBRs can provide suitable multiplexing and de-multiplexing in the above-described circuit structures.

Regardless of the components used, the above-described circuit structures suffer from disadvantages. For example, all include mechanical connections between the circuit components and include mechanical couplings of optical fiber. The connections can cause losses in the signal between components and are prone to mechanical failure. Additionally the spaced-apart components connected by fiber create relatively large structures. The footprint of assembled circuit structures is limited by the minimum bending diameter (approximately 5-centimeter) required for long-term mechanical reliability of standard telecommunications fiber. Many of the multiplexer devices are not suited for a wide range of temperatures, and the optical fiber connections tend to degrade in extreme conditions for all of the above structures. Also, temperature changes cause wavelength drifts that prevent the use of multiplexing devices in extreme conditions. Optical circuits used in such extreme conditions are often limited to one photonic signal per fiber, which increases costs, complexity, maintenance, and space requirements.

Accordingly, there is a continuing need to provide space-saving circuit structures and circuit components that provide excellent performance in a variety of conditions that are also relatively inexpensive to manufacture and maintain.

SUMMARY

The present disclosure is directed to an optical apparatus that provides multiplexing and de-multiplexing functions in a space saving circuit structure with a reduced number of necessary optical fiber connections to optimize optical performance and reliability. The optical apparatus includes an integrated structure that can provide both multiplexing and de-multiplexing functions so the apparatus can act as an optical transceiver. Also, the apparatus is able to function over a wide temperature range, which permits the use of multiplexing and de-multiplexing in environments that were previously limited to one photonic signal per fiber.

In one aspect, the present disclosure is directed to an optical apparatus suitable for coupling to an optical network and for transmitting and receiving multiplexed optical signals on the optical network. The optical apparatus includes an optical waveguide, a photonic generator array, and a photonic detector array. The optical waveguide includes at least one set of diffractive elements in the form of a scribed volume hologram. The optical waveguide includes a first optical input port and a first optical output port corresponding with the first optical input port. The waveguide also includes a second optical input port and a second optical output port corresponding with the second optical input port. The first optical output port and the second optical input port are adapted to be optically coupled to the optical network. The photonic generator array includes a plurality of photonic radiation generators. Each of the photonic generators is adapted to receive a generator input signal at a photonic generator input and generate a corresponding photonic signal at a photonic generator output in response to the generator input signal. The photonic generator outputs of the photonic generator array are directly coupled to the first optical input port. The photonic signals are incident on the diffractive elements and routed to the first optical output port as a transmitted multiplexed optical signal. The photonic detector array includes a plurality of photonic detectors. Each of the photonic detectors is adapted to receive a selected photonic signal at a detector input and to generate a corresponding detector output signal in response to the selected photonic signal. The detector inputs of the photonic detector array are coupled to the second optical input port. Optical signals received at the second optical input port are incident on the diffractive elements and routed to the second optical output port as de-multiplexed optical signals.

In another aspect, the present disclosure is directed to an optical apparatus suitable for coupling to an optical network. The optical apparatus is adapted to transmit multiplexed optical signals on the optical network or de-multiplex optical transmissions from the network. The optical apparatus includes an optical waveguide and an optoelectronic device. The optical waveguide has a set of diffractive elements in the form of a scribed volume hologram. The scribed volume hologram provides an optical transfer function. The optical waveguide also includes a first optical port and a second optical port corresponding with the first optical port. The second optical port is adapted to be optically coupled to the optical network. The optoelectronic device includes a plurality of optical portions. The optoelectronic device is adapted to convert optical signals at the optical portions into electric signals or convert electric signals into optical signals at the optical portions. The optoelectronic device is integrally formed with the optical waveguide at the first optical port.

In one example of this aspect, the optoelectronic device functions as a transmitter and includes a photonic generator array that has a plurality of vertical cavity surface emitting lasers. The photonic generator array is adapted to receive a generator input electrical signal and produce a photonic output in response to the generator input electrical signal. The vertical cavity surface emitting lasers are integrally formed with the optical waveguide at the first optical port. The photonic signals are incident on the diffractive elements and routed to the second optical port as a transmitted multiplexed optical signal.

In another example of this aspect, the optoelectronic device functions as a receiver and includes a photo detector array that has a plurality of photonic detectors, such as photodiodes. Each of the photonic detectors is adapted to receive a selected photonic signal at a detector input and to generate a corresponding detector output electrical signal in response to the selected photonic signal. The detector inputs of the photo detector array are integrally formed with the optical waveguide at the first optical port. The photonic signals are incident on the diffractive elements and routed to the second optical port as de-multiplexed optical signals.

DETAILED DESCRIPTION

This disclosure relates to optical circuit components for use with optical systems. The disclosure, including the figures, describes the circuit components and their parts with reference to several illustrative examples. For example, the present disclosure proceeds with respect to the particular transceiver described below. However, it should be noted that the present invention could be implemented in other circuit components, such as receivers or transmitters, as well. The present disclosure proceeds with respect to the transceiver for illustrative purposes only. Other examples are contemplated and are mentioned below or are otherwise imaginable to someone skilled in the art, including other circuit components as well. The scope of the invention is not limited to the few examples, i.e., the described embodiments of the invention. Rather, the scope of the invention is defined by reference to the appended claims. Changes can be made to the examples, including alternative designs not disclosed, and still be within the scope of the claims.

Figure 1A:
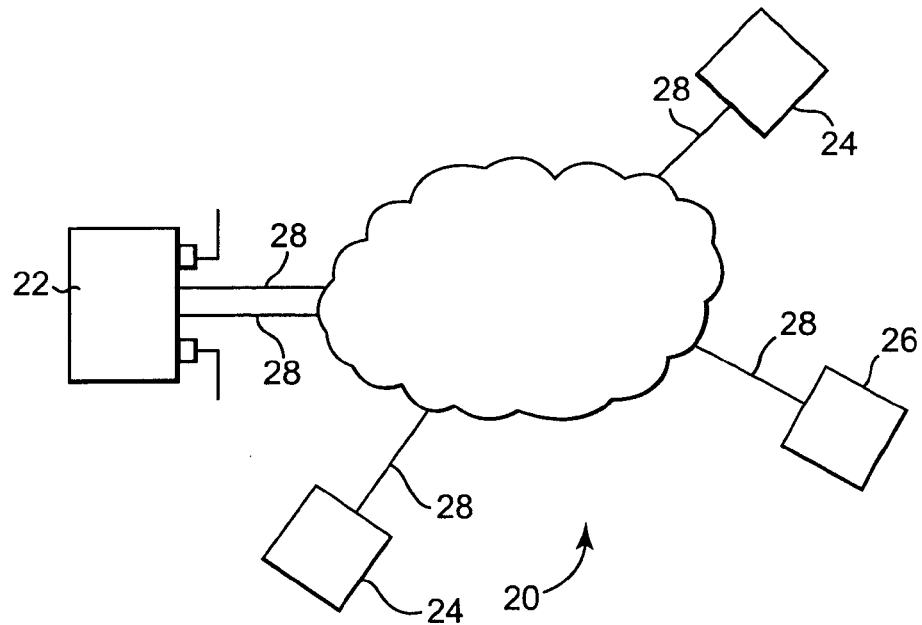
FIG. 1A is a schematic diagram of an exemplary optical network including several circuit components of the present disclosure.

FIG. 1A shows a schematic view of an optical network 20 incorporating a transceiver 22 of the present disclosure. The size of the network is generally irrelevant. The optical network 20 can be a long-distance telecommunications system that uses optical fiber, a short-distance system including device-to-device signal exchange in computers or other local area networks (LAN), a system between printed circuit boards, or an intermediate sized system. In the example shown, the network includes optical signal transmitters 24, optical signal receivers 26 and the transceiver 22 capable transmitting and receiving optical signals, all coupled to the network 20 with optical fibers 28. The network can also include other optical elements or circuit components such as repeaters, and so on, not shown in the figure.

Figure 1B:
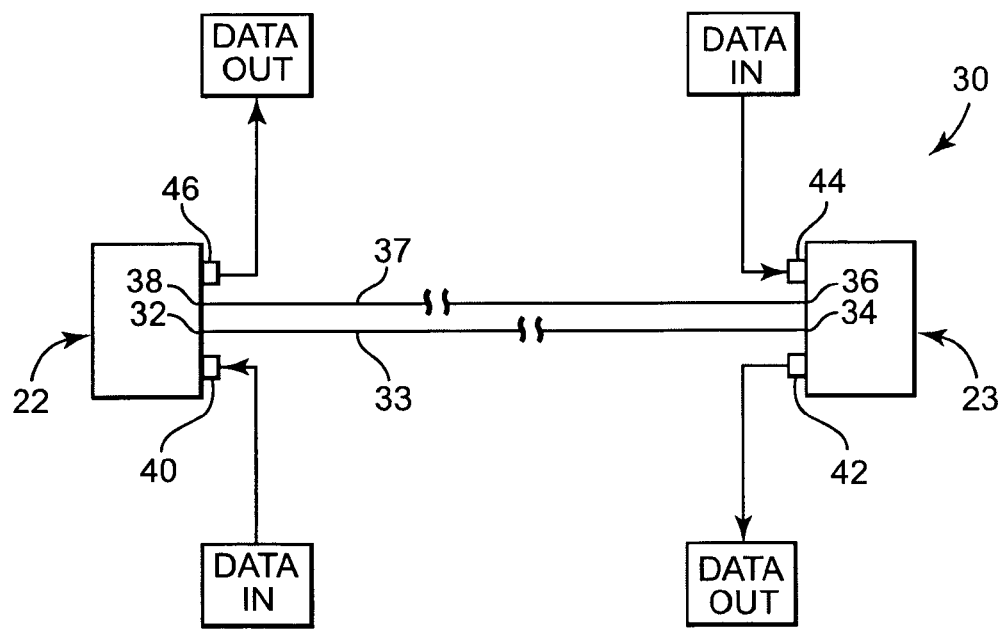
FIG. 1B is a schematic drawing of an exemplary optical circuit, which can be included on or comprise the optical network, including optical circuit components of the present disclosure.

FIG. 1B shows a schematic view of an exemplary circuit 30 which can be included in or be the optical network 20. The circuit 30 includes the transceiver 22 having an output 32 coupled by optical fiber 33 to the input 34 of a second transceiver 23. The second transceiver 23 includes an output 36 that is coupled by optical fiber 37 to the input 38 of the first transceiver 22. The first transceiver 22 receives data signals at its data input 40, converts the signals to an optical pulse or stream that is suitable for transmission, and transmits the pulse or stream to the second receiver 23 over fiber 33. The second receiver then separates the pulse or stream into useable signals that are provided at the data output 42. The second transceiver 23 receives second data signals at its data input 44, converts the signals to a optical pulse or stream that is suitable for transmission, and transmits the pulse or stream to the first receiver 22 over fiber 37. The second receiver then separates the pulse or stream into useable signals that are provided at the data output 46.

Figure 2:
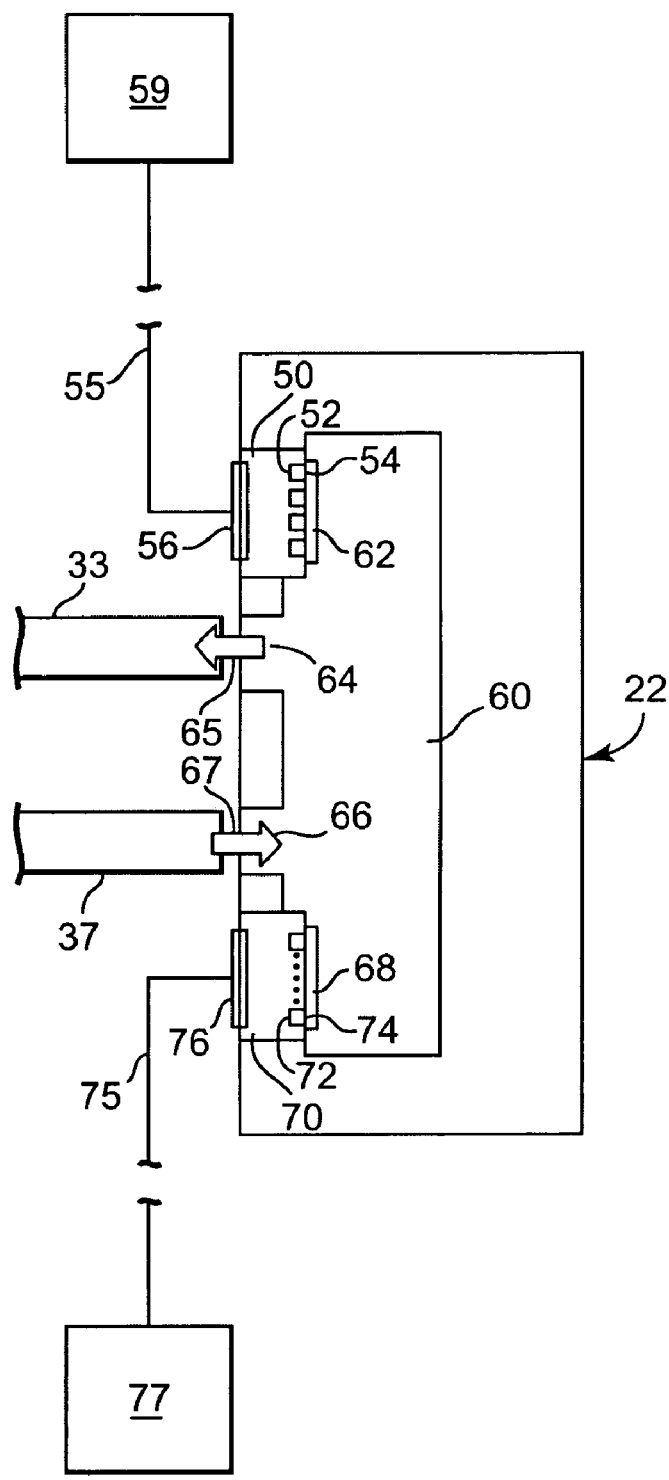
FIG. 2 is a schematic diagram of a general example of the optical circuit components shown in FIG. 1B.

FIG. 2 provides a schematic diagram of a general example of the transceiver 22. The transceiver 22 includes a photonic generator array 50 having a plurality of photonic radiation generators 52. The photonic radiation generators 52 each include a photonic generator output 54, which provides a photonic signal. The photonic generator array 50 includes a phonic generator input 56 that is adapted to receive a generator input signal 55 from one or more data sources 57. The photonic radiation generators 52 provide the photonic signals in response to the generator input signal 55.

The transceiver 22 also includes an optical waveguide 60. The optical waveguide 60 has a first optical input port 62 and a first optical output port 64 corresponding with the first optical input port 62. The photonic generators outputs 54 are directly coupled to the first optical input 62. The first optical output port 64 is adapted to be coupled to the network 20 and to provide a transmitted optical signal 65. The transmitted optical signal 65 at the first optical output port 64 is a function of the photonic signals presented to the first optical input port 62 from the photonic generator array 50. The first optical output port 64 is coupled to the network 20 through fiber 33.

The optical waveguide 60 is also coupled to fiber 37 at a second optical input port 66. The second optical input port 66 receives an optical signal 67 from the network 20. The optical waveguide 60 also includes a second optical output port 68 corresponding with the second optical input port 66. The second optical output port 68 provides optical signals that are a related to the optical signal 67 received at the second optical input port 66.

A photonic detector array 70 is coupled to second optical output port 68. The photonic detector array 70 includes a plurality of photonic detectors 72 having detector inputs 74 optically coupled to the second optical output port 68. The photonic detectors 72 each receive selected optical signals from the second optical output port 68. The photonic detectors 72 generate signal outputs in response to the received selected optical signals. The detector array 70 generates a detector output signal 75 at detector output 76 in response to the selected photonic signals, and the detector output signal 75 can be provided to one or more data receivers 77.

Figure 3:
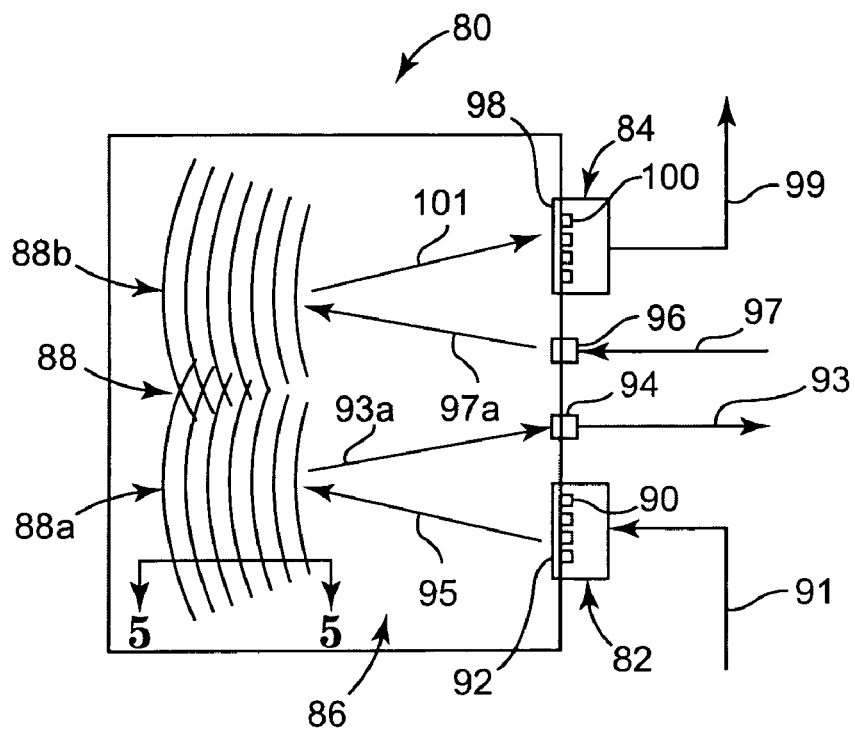
FIG. 3 is a schematic diagram of one example of the optical circuit component shown in FIG. 2.

FIG. 3 is a more detailed schematic diagram of one example of the transceiver 22, indicated at 80. The transceiver 80 includes a photonic generator array 82, a photo detector array 84, and an optical waveguide 86 having at least one set of diffractive elements 88 in the form of a scribed volume hologram. The transceiver 80 combines a plurality of data signals 91 into a single optical transmission 93.

The photonic generator array 82 includes generator outputs 90 directly coupled to the first optical input 92 of the optical waveguide 86. The first optical input 92 receives a plurality of radiation signals 95 from the outputs 90. The radiation signals are incident on the diffracted elements 88 and routed to the first optical output 94 as a single, or multiplexed, optical transmission 93a.

The photonic generator array 82 in the example receives data signals in the form of electrical signals 91 and converts the electrical signals 91 into the radiation signals 95, i.e., laser beams. In the example shown, the radiation signals 95 are generated with an array of laser diodes 90. The transceiver 80 in the illustrated example receives four electrical signals 91 at the photonic generator array 82. Each electrical signal is provided to a corresponding laser diode 90, and each laser diode 90 generates a laser beam 95 that is directly provided to the first optical input 92. In the specific example shown, electrical signals are provided to the photonic generator array 82 to generate four channels of photonic signals provided from four laser diodes 90.

The laser diode is a semiconductor device that produces coherent radiation when current passes through the device. One example of a suitable laser diode 90 is a vertical cavity surface emitting laser (VCSEL). The acronym VCSEL is pronounced "vixel." The VCSEL is particularly suited for fiber optic communication because it is less expensive, more efficient and provides for faster data speed than older laser diodes, such as edge-emitting diodes. VCSELs also tolerate wide temperature ranges making them optimal for use in extreme conditions. The VCSEL includes an active region with an active layer that produces the laser beam. The active region is sandwiched between a pair of reflectors. A common reflector is a distributed Bragg reflector (DBR), which includes alternatively laminated high-refractive index layers and low-refractive index layers. The laser emits from the VCSEL often in the shape of a cone. Common VCSEL materials include gallium arsenide (GaAs), aluminum gallium arsenide (AlGaAs), and indium gallium arsenide nitride (InGaAsN), and VCSELs can be manufactured with known semiconductor manufacturing techniques. A VCSEL array is a linear array of discrete VCSELs on an integrated circuit.

The transceiver 80 also separates a single optical transmission 97 into a plurality of data signals 99. The single optical transmission 97 is provided to the second optical input port 96. The optical transmission 97a is incident on the diffractive elements 88 and routed to the second optical output port 98 as a plurality of de-multiplexed optical signals 101. The plurality of optical signals 101 is provided to photonic detector array, which generates a plurality of corresponding data signals 99.

The photonic detector array 84 in the example receives the de-multiplexed optical signals 101 and converts each of the photonic signals into a corresponding electrical signal 99. In the example shown, the electrical signals 99 are generated with an array of photodiodes 100. The transceiver 80 in the illustrated example provides four optical signals 101 at the photonic detector array 84. Each optical signal 101 is provided to a corresponding photodiode 100, and each photodiode 100 generates an electrical signal corresponding with the selected optical signal 101.

The photodiode is a semiconductor device that generates a current in response to a received optical signal. A photodiode array (PDA) is a linear array of discrete photodiodes on an integrated circuit. The photodiode array is placed at the image plane, i.e., the second optical output port 98 in the example, to allow a range of wavelengths to be detected simultaneously. Two suitable types of photodiodes include a positive intrinsic negative diode, commonly referred to in the art as a PIN diode and an avalanche photodiode (APD).

One general example of a PIN diode, for illustration, has a multi-layered structure formed by epitaxially growing on an n-InP substrate and n-InP buffer layer, an n-InGaAs photo-detecting layer and an n-InP window layer. A Zn diffusion region is provided in the center section of the n-InP window layer where this portion is changed from n-type to p-type. The Zn diffusion region extends to the n-InGaAs photo-detecting layer to form a p-n junction. A ring-like p-electrode in which a window is provided to allow the incidence of light is provided on the surface of the Zn diffusion region. The window can be coated with an anti-reflection-film coating. An n-electrode is also provided by the vacuum evaporation process on the opposite end surface of the InP substrate. Light enters through the antireflection-film coating into the interior of the element. The window layer consists of InP, band gaps of which are larger than those of InGaAs, and is rather thin. Accordingly, the amount of light absorbed at the window layer is relatively small. The PIN photodiode is particularly advantageous for its light sensitivity and value. The light incident surface and the active region photodiode are positioned adjacent to each other so that there is little chance that light is absorbed at an inactive region thus improving quantum efficiency and detection sensitivity.

An avalanche photodiode (APD) is a photodiode that internally amplifies a photocurrent with an avalanche process. A relatively large reverse-bias voltage is applied across the active region, which causes electrons initially generated by the incident photons to accelerate as they move through the APD active region. As the electrons collide with other electrons in the semiconductor material, they cause a fraction of them to become part of the photocurrent, which is known as avalanche multiplication. Avalanche multiplication continues to occur until the electrons move out of the active area. Typical semiconductor materials used in the construction of APDs include silicon (Si), indium gallium arsenide (InGaAs), and germanium (Ge). The response time of an APD and its output circuitry depends on the same factors as PIN diodes. The only additional factor affecting the response time of an APD is the additional time required to complete the process of avalanche multiplication.

The optical waveguide 86 in the example is a planar optical waveguide. The planar optical waveguide 86 substantially confines, in one transverse dimension, optical signals propagating in the other two dimensions within the waveguide. The term "planar waveguide" is not consistently used in the art to mean a two dimensional or one dimensional (or channel) waveguide, but for the purposes of this disclosure, the term is used to mean a two dimensional (or slab) waveguide. The waveguide 86 typically comprises a core surrounded by a lower refractive-index cladding. The core includes one or more dielectric materials substantially transparent over a range of desired operating wavelengths. The cladding can include a number of materials, but typically comprises dielectric materials.

The diffractive elements 88 in the waveguide 86 provides the functions of spatially routing optical signals from an optical input port 92, 96 to the respective optical output ports 94, 98 and imparting selected spectral and temporal characteristics of the incident optical signals 93a, 101. The diffractive elements 88 can be linear, curvilinear, or both, and provide optimal routing, imaging and focusing of the optical signals 95, 97a between their respective input ports 92, 96 to the respective output ports 94, 98.

Figure 4:
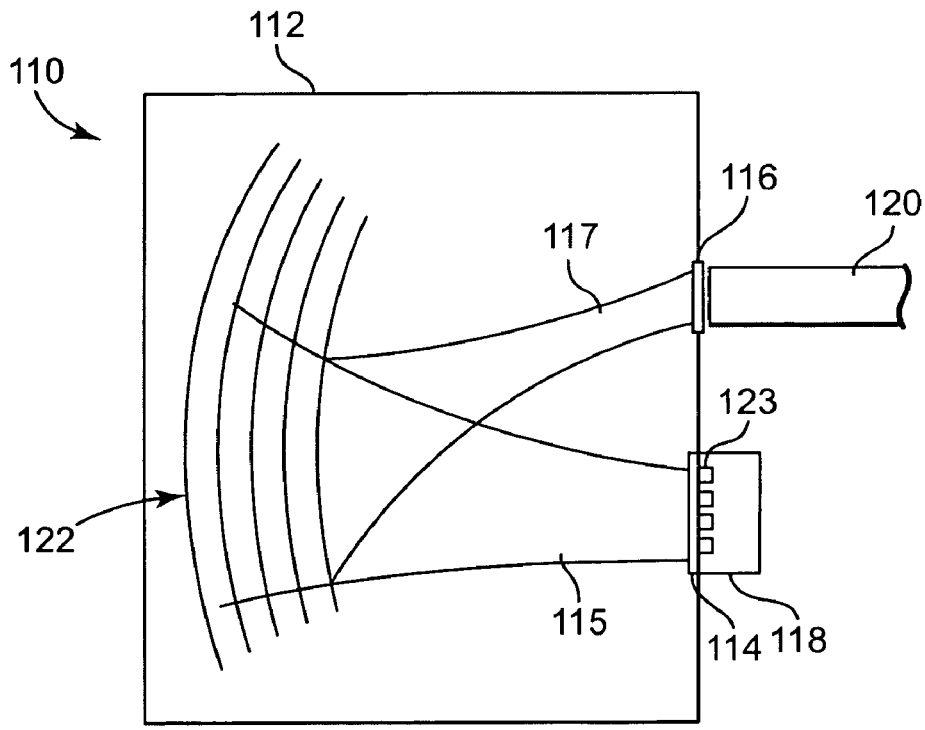
FIG. 4 is a schematic diagram of another example optical circuit component of the present disclosure.

FIG. 4 is a schematic view of a device 110 that is a modified version of the transceiver 80 shown above providing a simplified view of the optical signal routing with a waveguide and illustrates the structure and operation of the waveguide 86. The transceiver 80 of FIG. 3 is a "four port" device in that it has two optical input ports and two optical output ports. The device 110 of FIG. 4 is a "two port" device in that it includes a planar optical waveguide 112 that has a first optical port 114 and a second optical port 116.

The device 110 can function as either an optical receiver or an optical transmitter. An optoelectronic device 118 is directly coupled to the first optical port 114, and an optical fiber 120 is coupled to the second optical port 116. The second optical port 116 can be coupled to an optical network with the optical fiber 120.

The device 110 functions as an optical transmitter when the optoelectronic device is a photonic generator array, as described above. The planar waveguide 112 then functions to receive several optical signals 115 at the first optical port 114 and combines them into one optical transmission 117 routed to the second optical port 116.

The device 110 can function instead as an optical receiver when the optoelectronic device 118 is a photonic detector array, as described above. In this case, the planar waveguide functions to receive one combined optical transmission 117 at the second optical port 116 and separates the transmission 117 into its component signals 115 routed to the first optical port.

In the example, the waveguide 112 includes a set of diffractive elements 122 in the form of a computer-generated, two-dimensional, distributed Bragg reflective structure with nano-scale features photo-lithographically scribed on the core-cladding interface. The diffractive elements 122 of the example, which can be referred to as a holographic Bragg reflector, are a form of a scribed volume hologram. The set of diffractive elements 122 of the example include etched diffractive contours that can be optimized as a computer-generated hologram (or aspheric optic) to create virtually any desired spatial wavefront transformation required to map an input optical signal wavefront onto the output port 116. Successive diffractive contours are selectively placed to impart generally constructive phase delays between successive diffracted wavefronts.

The set of diffractive elements 122 include two or more diffractive elements, but typically in the range of one thousand to ten thousand elements in a particular waveguide 112. The individual diffractive elements are too small to be seen with the naked eye and typically are separated by an integer number of half wavelengths of a reflected field (wavelength inside the waveguide 112). The thickness of the waveguide (along the direction of the confined dimension) is typically four to eight times the wavelength of the reflected field. At typical telecommunication wavelengths, the thickness can be about six micrometers in waveguides made from silica.

In the case of the transmitter, four radiation generators in the array (opto-electric device 118) each provide an optical signal, collectively 115, to the first optical port 114. The four optical signals 115 are four channels having spaced-apart wavelengths. The diffractive elements 122 converge the optical signals 115 into the optical transmission 117 and route them to the second optical port 116. In one example, the diffractive elements 122 are arranged as focusing elements and the second optical port 116 is located at a conjugate image point defined by the focusing elements. The device 110 of the illustration acts to multiplex the several optical signals 115 into the optical transmission 117 and functions as a Custom Coarse Wavelength Multiplexer.

In the case of the receiver, the diffractive elements 122 are designed to separate an optical transmission 117 into its individual signal components 115, and then to route, or focus, the components to the first optical port 114 and to their respective photonic detectors in the detector array (opto-electric device 118). For example, the routing path of the optical signals inside the waveguide 112 is reversed in the receiver with respect to the path in the transmitter. In this case, the receiver acts to de-multiplex the optical transmission into its components and functions as a Custom Coarse Wavelength De-Multiplexer.

Returning to FIG. 3, the four port planar optical waveguide 86 of transceiver 80 includes two sets (or portions) of diffractive elements, schematically shown at 88a and 88b, each of which provides a separate spatial and spectral transfer function in an integrated dual-component optical structure. In the case of the waveguide 86, diffractive elements 88a correspond with the first optical input and output ports 92, 94 and provide an optical signal multiplexing function for optical signals 95 received from the generator array 82 and routed through the waveguide 86. Diffractive elements 88b correspond with the second optical input and output ports 96, 98 and provide an optical signal de-multiplexing function for optical transmissions 97 received from the network and routed through the waveguide 86 to the detector array 84. The diffractive elements 88 can be designed so that at least some, if not most or all, of the two sets of optical structures overlap or are interleaved with each other. It is also contemplated that the waveguide can be designed so that only one set of diffractive elements is needed to provide multiplexing and de-multiplexing functions in a four or more port device.

The transceiver 80 is durable over a wide range of conditions. When the optical transmission is made up of several, such as four, spaced-apart-wavelength channels provided by the VCSEL array 82, the transceiver 80 still maintains channel separation despite temperature drift in a wide variety of temperature ranges. In addition, the device operates in many temperature environments without the need for thermal control systems. Another advantage of the transceiver 80 is that it is more durable than the devices of the related art. For example, the transceiver will properly route optical signals through the waveguide 86 even if several of the diffractive elements are crushed or damaged due to the nature of scribed volume hologram. This would not be possible with TFFs or AWGs.

The transceiver is also adaptable to a wide variety of optical systems or applications. One feature of the scribed volume hologram is that the diffractive elements are "tunable." That is, subjecting the dielectric materials in the core, cladding, or both to an electric current will change refractive indexes of the materials and can continuously vary the transfer function of the waveguide. The transceiver can also be used with a variety of fiber types, including multi-mode fibers. The transceiver can be used at a greater range of wavelengths, such as at 850 nm, 1310 nm, and 1550 nm. Systems having optical signals having wavelengths of 850 nm and 1550 nm have previously proven to be a challenge for designers for reasons such as complexity and temperature dependence. Also, existing systems can easily be retrofit with the transceiver, and systems that previously required one photonic signal per fiber can be adapted to include the transceiver to save space and maintenance cost without sacrificing performance.

Figure 5:
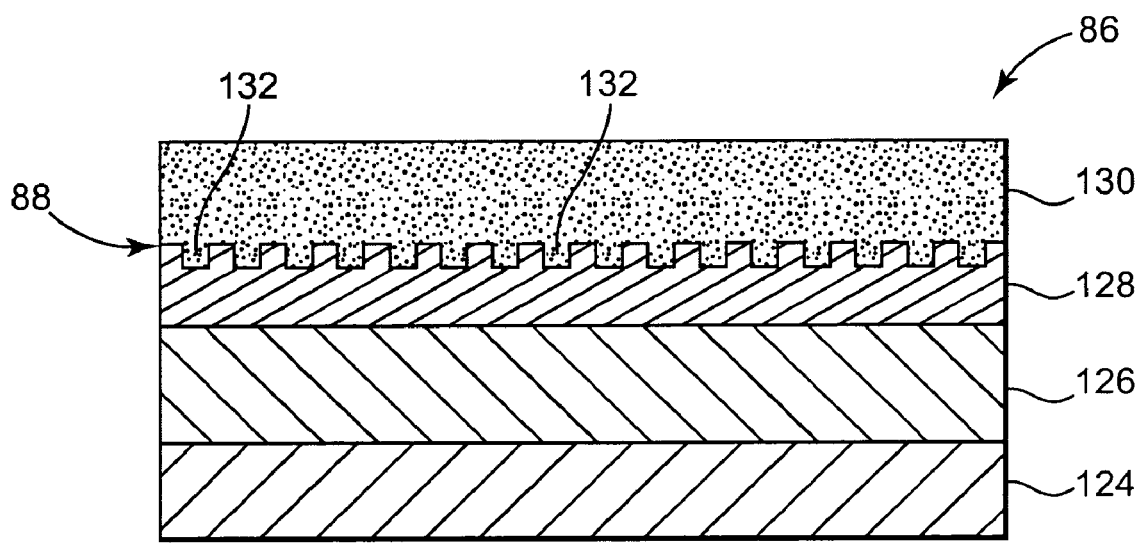
FIG. 5 is a schematic diagram of a cross-sectional view of the optical component of FIG. 3.

FIG. 5 shows a schematic diagram of a cross section of the waveguide 86 taken along lines 5—5 in FIG. 3. In one example, the waveguide 86 includes a silicon substrate 124, a silica (SiO2) lower cladding 126, a Ge-doped silica core 128, and an upper cladding 130 formed of a co-polymer of poly-methylmethacrylate (PMMA) and trifluoroethylmethacrylate (TFMA). The refractive indexes of the upper and lower claddings 130, 126 are less than the core 128. The core and upper cladding interface includes the diffractive elements 88. The diffractive elements 88 of the waveguide 86 are formed by grooves 132 etched into the core 128 and filled with the co-polymer used in the upper cladding 130.

The waveguide 86 can be formed with known processes. For example, the core 128 can be deposited with chemical vapor deposition (CVD) on an oxidized silicon wafer and then the grooves 132 can be etched with reactive ion etching (RIE). The upper cladding co-polymer can be applied by spin-coating and curing. Similar semiconductor manufacturing processes can be used to form the photonic generator array 82 and the photonic detector array 84. Accordingly, the components of the apparatus can be integrally formed in a single package without the use of optical fibers connecting them. The generator array 82 can be formed directly adjacent to the first optical input port 92 and thus directly coupling the generators 90 to the first optical input port. The detector array 84 can also be formed directly adjacent to the second optical output port 98 and thus directly coupling the photonic detectors 100 to the second optical output port 98. In addition, a plurality of sets of diffractive elements can be formed in the single core/upper cladding interface thus integrating both multiplexing and de-multiplexing features into the same structure.

The entire transceiver is preferably implemented in an integrated circuit package, having electrical inputs and outputs for power, ground, data signals, and possibly transfer function tuning, and optical inputs and outputs adapted for coupling to the network. In the case of the transmitter, the package need not include data signal outputs or optical signal inputs. In the case of a receiver, the package need not include data signal inputs or optical signal outputs. Other combinations are possible. In one example, the integrated circuit package is a flip-chip or a wire bond package having mechanical connections suitable for connecting the optical inputs and outputs to optical fiber.

The present invention has now been described with reference to several embodiments. The foregoing detailed description and examples have been given for clarity of understanding only. Those skilled in the art will recognize that many changes can be made in the described embodiments without departing from the scope and spirit of the invention. Thus, the scope of the present invention should not be limited to the exact details and structures described herein, but rather by the appended claims and equivalents.

What is claimed is:

1. An optical apparatus suitable for coupling to an optical network and transmitting and receiving multiplexed optical signals on the optical network, the optical apparatus comprising:

an optical waveguide having a plurality of sets of diffractive elements in the form of a scribed volume hologram, the optical waveguide having a first optical input port and a first optical output port corresponding with the first optical input port, the optical waveguide also Including a second optical input port and a second optical output port corresponding with the second optical input port, wherein the first optical output port and the second optical input port are adapted to be optically coupled to the optical network;

a photonic generator array having a plurality of photonic generators, wherein each of the photonic generators is adapted to receive a generator input signal at a photonic generator input and generate a corresponding photonic signal at a photonic generator output in response to the generator input signal;

wherein the photonic generator outputs of the photonic generator array are directly coupled to the first optical input part, and wherein the photonic signals are incident on a first set of diffractive elements and routed to the first optical output port as a transmitted multiplexed optical signal; and a photonic detector array having a plurality of photonic detectors, wherein each of the photonic detectors is adapted to receive a selected photonic signal at a detector input and to generate a corresponding detector output signal in response to the selected photonic signal;

wherein the detector inputs of the photonic detector array are coupled to the second optical output port, and wherein optical signals received at the second optical input port are incident on a second set of diffractive elements and routed to the second optical output port as de-multiplexed optical signals.

2. The optical apparatus of claim 1 wherein the optical waveguide is a planar optical waveguide, and the optical signals propagating within the optical waveguide are substantially confined in at least one transverse spatial dimension such that the optical signals propagate in generally two-dimensions.

3. The optical apparatus of claim 2 wherein optical waveguide comprises a core and cladding interface, and wherein the diffractive elements are scribed in the core and cladding interface.

4. The optical apparatus of claim 3 wherein the diffractive elements are photo-lithographically scribed into the core and cladding interface.

5. The optical apparatus of claim 1 wherein the first set of diffractive elements includes selected transfer function for multiplexing the photonic signals at the first optical input port, and the second set of diffractive elements includes another selected transfer function for de-multiplexing the optical signals received at the second optical input port.

6. The optical apparatus of claim 5 wherein the transfer functions are selectively and continuously variable by subjecting the diffractive elements to an electrical tuning signal.

7. The optical apparatus of claim 1 wherein the diffractive elements are arranged as focusing elements, and wherein the first optical input port and the first optical output port are located at corresponding conjugate image points defined by the focusing elements.

8. The optical apparatus of claim 1 wherein the photonic radiation generators include laser diodes.

9. The optical apparatus of claim 8 wherein the laser diodes include vertical cavity surface emitting lasers.

10. The optical apparatus of claim 9 wherein the vertical cavity surface emitting lasers are integrally formed with the waveguides.

11. The optical apparatus of claim 1 wherein the generator input signal and the detector output signal are electrical signals.

12. The optical apparatus of claim 1 wherein the first optical output port is adapted to coupled to an output optical fiber on the optical network, and the second optical input port is adapted to be coupled to an input optical fiber on the optical network.

13. The optical apparatus of claim 1 wherein the detector inputs of the photonic detector array are directly coupled to the second optical output port of the optical waveguide.

14. The optical apparatus of claim 13 wherein the photonic detector array is one of a positive intrinsic negative diode array or an avalanche photodiode array.

* * * * *

UNITED STATES PATENT AND TRADEMARK OFFICE
CERTIFICATE OF CORRECTION

PATENT NO. : 7,184,622 B2  Page 1 of 1
APPLICATION NO. : 11/080703
DATED : February 27, 2007
INVENTOR(S) : Brian L. Uhlhorn et al.

It is certified that error appears in the above-identified patent and that said Letters Patent is hereby corrected as shown below:

Column 11, line 11, delete "part" and insert --port--.

Signed and Sealed this

Twenty-fourth Day of April, 2007

JON W. DUDAS
*Director of the United States Patent and Trademark Office*